July 1, 1958  W. J. MISKELLA  2,841,684
APPARATUS FOR BAKING PAINT ON AUTOMOTIVE VEHICLES
Filed June 12, 1956  4 Sheets-Sheet 3

Inventor:
William J. Miskella
By Ahlberg, Kupper & Gradolph
Attorneys

July 1, 1958 W. J. MISKELLA 2,841,684
APPARATUS FOR BAKING PAINT ON AUTOMOTIVE VEHICLES
Filed June 12, 1956 4 Sheets-Sheet 4

Inventor:
William J. Miskella
By Ahlberg, Hueppe & Gradolph
Attorneys.

United States Patent Office 2,841,684
Patented July 1, 1958

2,841,684

APPARATUS FOR BAKING PAINT ON AUTOMOTIVE VEHICLES

William J. Miskella, Cleveland, Ohio

Application June 12, 1956, Serial No. 590,950

8 Claims. (Cl. 219—35)

The present invention relates to heat radiating apparatus for baking paint on the exterior surfaces of automotive vehicles and the like.

One object of the invention is to provide improved paint baking apparatus of the above character which can be readily accommodated to automotive vehicles of different size to apply optimum paint baking heat uniformly over substantially the entire exterior surface of each vehicle notwithstanding the wide variations along the vehicle in the shape and dimensions of the painted surface.

Another object is to provide an improved movable and adjustable paint baking apparatus which is suspended from an overhead track system, which can be moved to a storage position to permit paint spraying of an object such as an automotive vehicle, and which can be translated from storage position along the painted object without support from the floor thus obviating the use of floor wheels or other floor support structure which would obstruct traffic along the floor.

Another object is to provide improved paint baking apparatus of the character recited which can be operated with great ease and convenience.

A further object is to provide improved paint baking apparatus, as recited in the previous objects, which is well adapted to be easily installed and permanently housed in a paint spray booth thus providing an improved installation for spraying and baking paint on automotive vehicles, which effects very substantial economies while at the same time affording extraordinary efficiency by minimizing the overall space requirements for the entire installation, by providing for improved baking of paint on vehicles of different size in the same installation, and by minimizing the cost of the paint baking structure required in the installation.

Other objects and advantages will become apparent from the following description of the exemplary embodiment of the invention illustrated in the drawings, in which.

Figure 2:
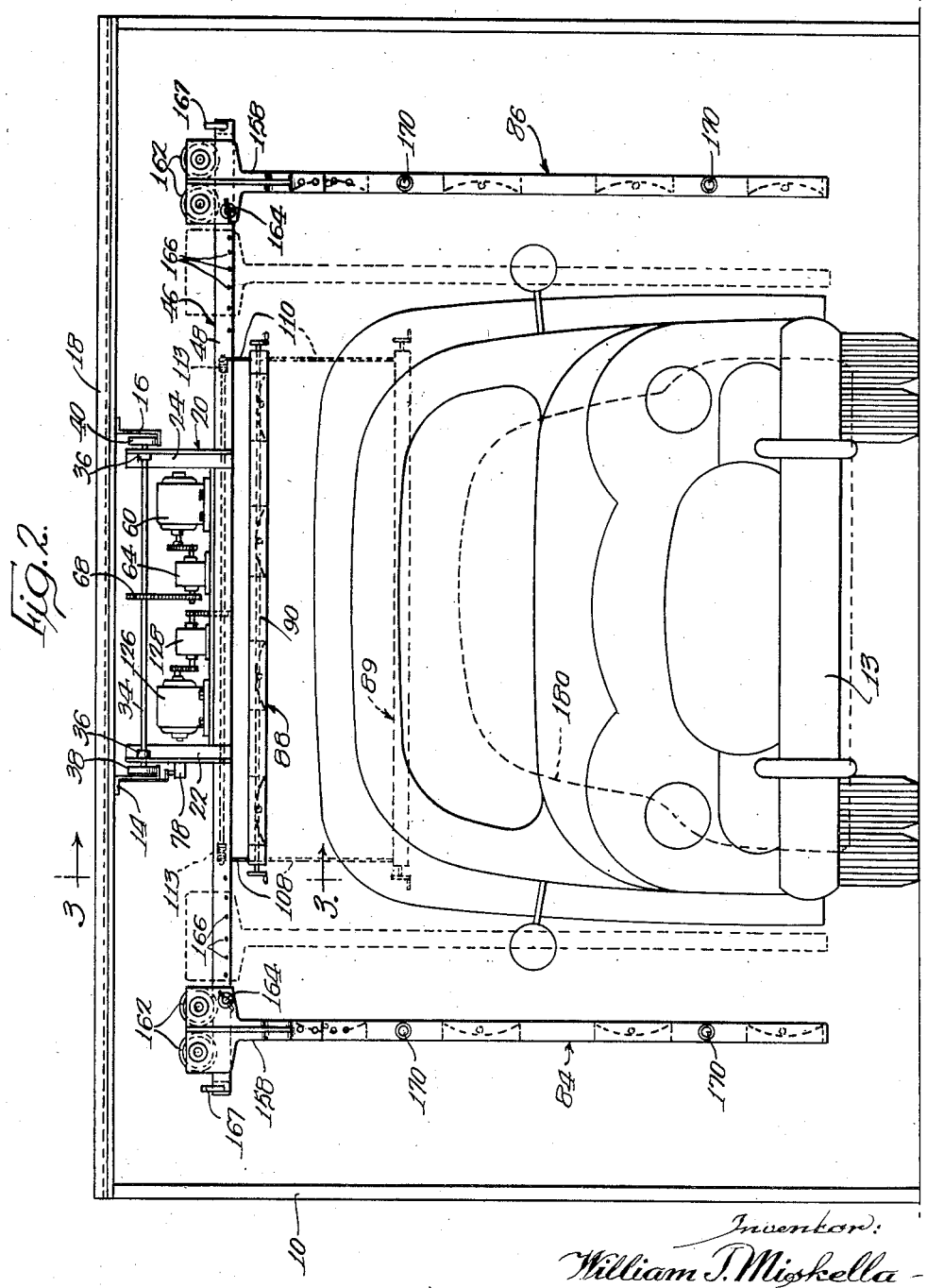
Fig. 2 is a transverse front view of the spray booth showing the paint baking apparatus adjusted to accommodate an automotive vehicle of large size and illustrating in phantom an adjustment of the apparatus to accommodate a vehicle of much smaller size.

Designed to be easily installed and permanently housed in an automotive vehicle paint spray booth 10 of generally rectangular shape, the paint baking apparatus forming the illustrated embodiment of the invention is suspended from generally straight, horizontal track structure 12 adapted to be supported in an overhead position in which it overlies longitudinally a vehicle 13, Fig. 2, parked for painting in the booth. As shown, the track means 12 comprises a pair of spaced parallel Z-rails 14, 16 bolted to the ceiling structure 18 of the booth 10 and extending approximately the full length of the booth. Sufficient ceiling height is provided in the booth 10 to afford very substantial vertical space between the support rails 14, 16 and the top of the tallest vehicles which are to be accommodated by the paint baking apparatus.

Thus positioned, the two rails 14, 16 provide support to a vehicle traversing carriage 20 comprising four vertical standards 22, 24, 26 and 28. Positioned at the four corners of a rectangle, as viewed from above, the four carriage standards 22, 24, 26 and 28 extend upwardly between the two rails 14, 16. The upper ends of the standards terminate somewhat above horizontal track flanges 30 and 32, Fig. 5, on the lower marginal edges of the respective rails. The four carriage standards are spaced from each other to locate two standards 22, 26, Fig. 3, adjacent the rail 14 and to locate the other two standards 24, 28, Fig. 5, adjacent the rail 16.

The two standards 22, 24, located transversely across from each other with respect to the rails 14, 16 are supported on a common rotary axle or shaft 34 extending through support bearings 36 in the upper ends of the respective standards. Opposite ends of the shaft 34 project beyond the respective standards 22, 24 to connect nonrotatably with two drive wheels 38, 40 which rest on the rail flanges 30, 32. Similarly, the other two standards 26, 28 are supported by a shaft 42, Figs. 3 and 5, extending through the upper ends of the two standards and supported at opposite ends by a wheel 44, Fig. 3, resting on the rail flange 30 and by a similar wheel (not shown) resting on the rail flange 32.

Thus supported for translation along the rails 14, 16, the carriage 20 supports a horizontally elongated rectangular frame 46 in underlying, perpendicular relation to the rails. As will presently appear, the horizontal frame 46 is rather narrow in width horizontally but has a length sufficient to extend a substantial distance beyond each side of the largest vehicle 13, Fig. 2, to be accompanied by the paint baking apparatus.

Figure 1:
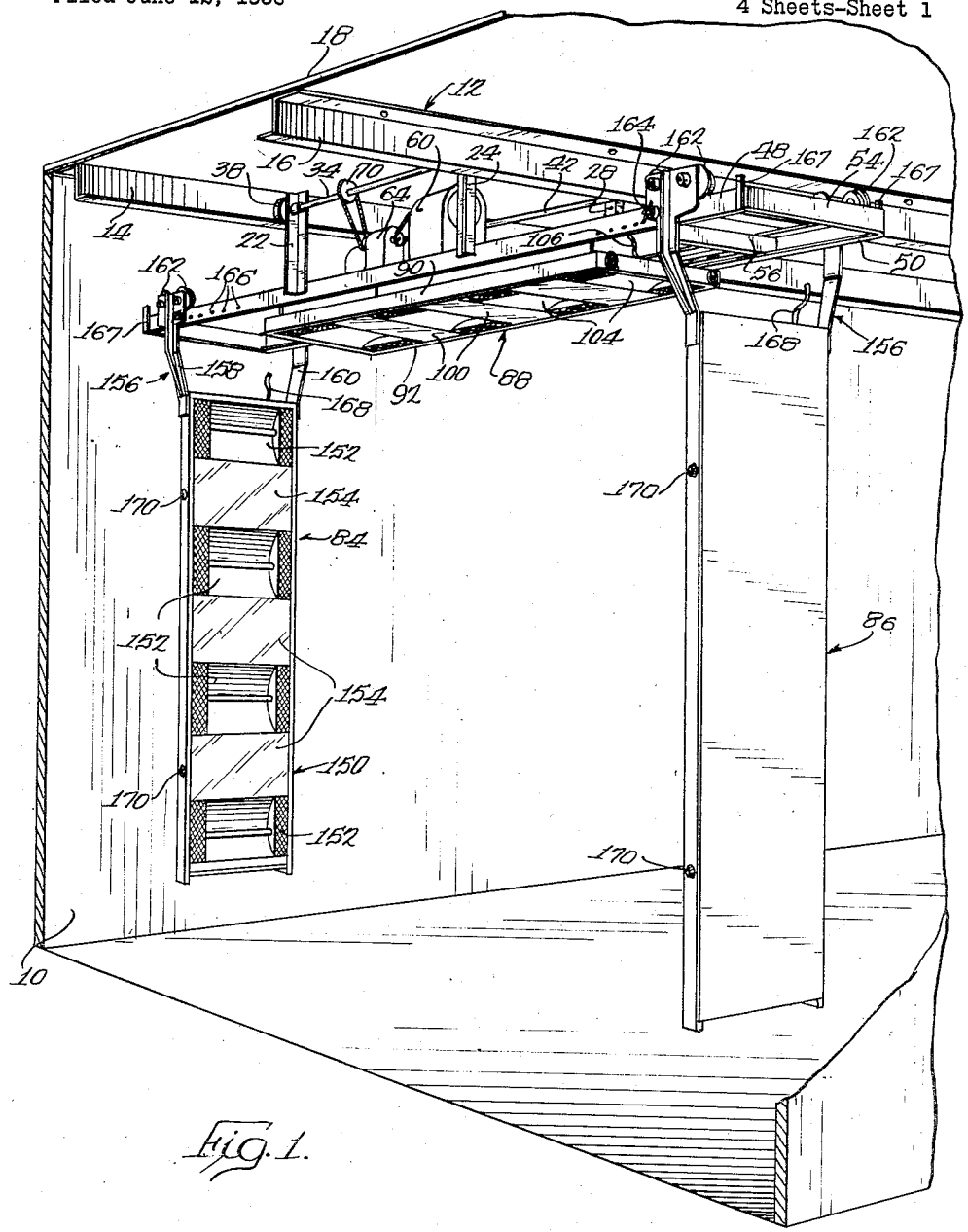
Figure 1 is a perspective view showing the exemplary form of the invention incorporated into an automotive vehicle paint spray booth, which is partially broken away for clearness in illustration.
Figure 3:
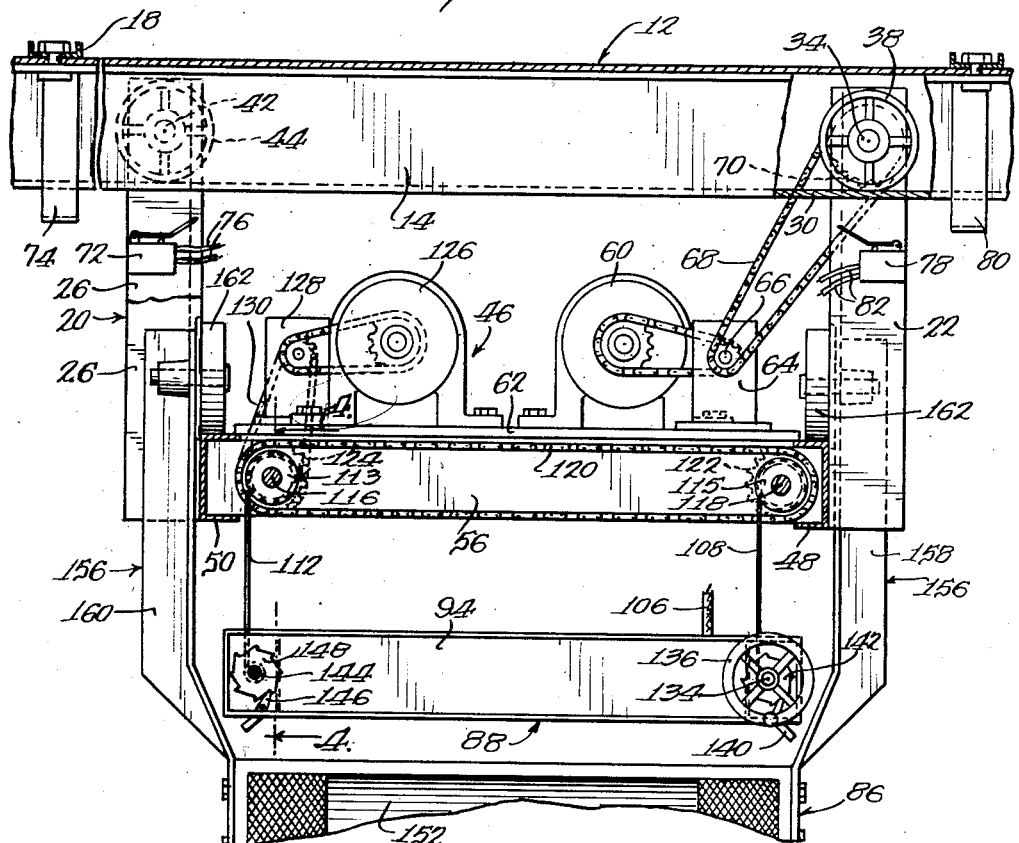
Fig. 3 is a fragmentary sectional view taken generally along the line 3—3 of Fig. 2.
Figure 4:
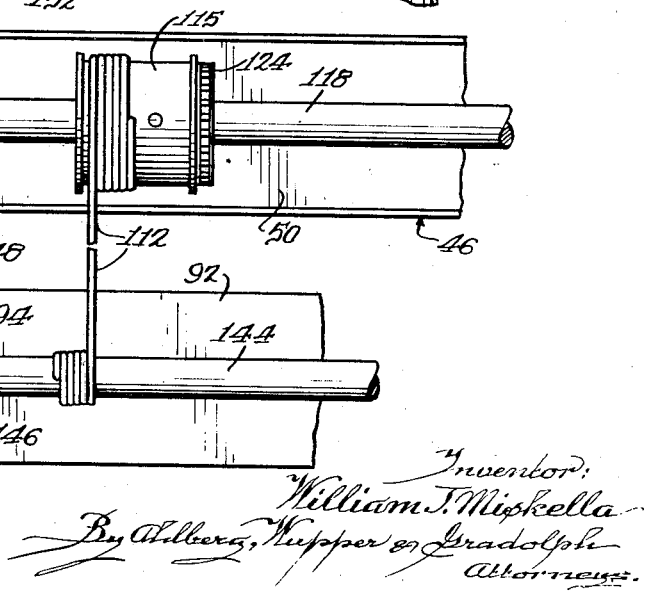
Fig. 4 is a fragmentary sectional view taken generally along the line 4—4 of Fig. 3.
Figure 5:
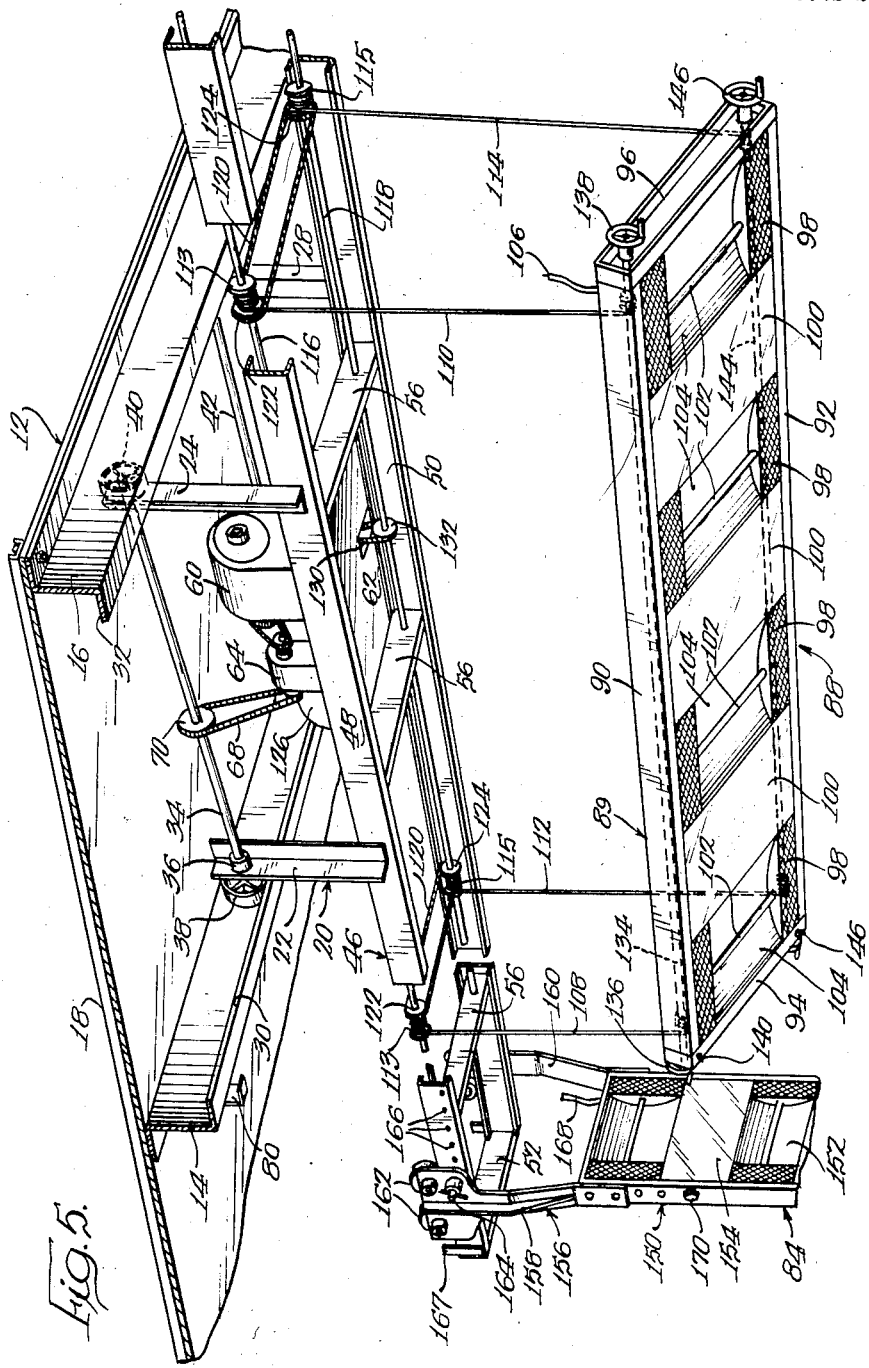
Fig. 5 is a fragmentary perspective view showing an adjustment of the suspended paint baking apparatus to bake paint on an inclined surface.

Basically, the frame 46 is formed by two longitudinal side channels 48, 50, Figs. 3 to 5, extending the full length of the frame and connected at opposite ends by two end plates 52 and 54, Figs. 1 and 5. Intermediate its longitudinal ends, the frame 46 is reinforced by a series of spaced transverse plates 56, Fig. 5, connected between the longitudinal side channels 48, 50.

To support the frame 46, the lower ends of the carriage standards 22, 24, depending from the axle 34, are fixed to the side channel 48 and the lower ends of the carriage standards 26, 28, depending from the axle 42, are fixed to the longitudinal channel 50.

Thus suspended by the carriage 20 in overlying relation to a vehicle 13, the horizontal frame 46 is traversed or translated longitudinally over the vehicle by means of a power drive comprising a reversible electric motor 60 mounted on a sturdy top plate 62 supported on the central portion of the frame 46. As shown, the traversing motor 60 is connected to drive a speed reducer 64 also mounted on the plate 62 adjacent the motor. The output shaft 66, Fig. 3, of the speed reducer 64 is connected by a sprocket chain 68 to a sprocket wheel 70, Fig. 5, fixed to the central portion of the carriage drive shaft 34. In this manner the speed reducer 64 forms a part of a transmission connecting the reversible motor 60 to the drive wheels 38, 40.

Control of the traversing motor 60 to operate in either direction to translate the frame 46 toward either the front or rear of the spray booth 10 is simplified by the use of limit switch means provided for this purpose. Thus, as most clearly shown in Figs. 2 and 3, a limit switch 72 is mounted on the carriage standard 26 for operation by a switch actuator 74, adjustably secured to the support rail 14, as an incident to movement of the carriage toward the rear of the spray booth to a position determined by preadjustment of the actuator 74 along the rail 14. Ordinarily the switch 72 is interconnected by means of lead wires 76 with the traversing motor 60 to deenergize the traversing motor when the carriage 20 has reached a rear position in the spray booth at which the switch is operated by the actuator 74. Another limit switch 78, Fig. 3, is similarly mounted on the carriage standard 22 for operation by a switch actuator 80 adjustably mounted on the rail 14. Preferably, the switch 78 is interconnected by leads 82 with the traversing motor 60 to reverse the motor when the carriage 20 has moved toward the front of the spraying booth to a position predetermined by adjustment of the actuator 80 along the rail 14. Suitable wiring can be readily supplied by a person skilled in the art to control energization of the motor 60 and to interconnect the limit switch leads 76 and 82 with the motor to control the motor in the manner described.

Translatable longitudinally over a vehicle 13 parked in the booth 10 for painting, the horizontally elongated frame 46 provides support to adjustable banks of radiant heat generators which can be readily accommodated to vehicles of different size to apply optimum paint baking heat uniformly over substantially the entire exterior surface of each vehicle including surface portions of radically varying size and shape. Thus, a pair of vertical heater or lamp banks 84, 86 are suspended on opposite ends of the frame 46 for translation toward and away from a transverse vertical plane through the center of the frame, and a horizontal lamp bank 88 is suspended from the frame 46 between the two lamp banks 84, 86.

The central lamp bank 88 comprises a narrow elongated frame 89, Fig. 5, formed by two longitudinal side channels 90, 92 connected together at opposite ends by end channels 94, 96. The frame thus formed provides support to four infrared lamp holders 98 individually constructed in a manner disclosed in my copending application Serial No. 514,016, filed June 8, 1955, and entitled "High Heat Infrared Lamp Holder." As shown the four lamp holders 98 are positioned transversely in the frame 89 in spaced relation to each other longitudinally along the frame. The spaces between the adjacent holders 98 are covered flush with the holders by metallic reflectors 100 supported on the frame 89. As taught in the previously mentioned application Ser. No. 514,016, each lamp holder 98 includes a high intensity infrared lamp tube 102 mounted longitudinally in the holder in front of a concave reflector 104. As shown the lamp holders 98 are oriented in the frame 89 to radiate heat downwardly or, more specifically, downwardly in generally perpendicular relation to the central plane of the frame 89. The infrared tubes 102 of all four lamp holders are connected for energization through a flexible electric cable 106 extending upwardly from the lamp bank 88 to interconnect with suitable switch control structure (not shown) which can be supplied readily by those skilled in the art.

The lamp bank 88 is supported from the frame 46 by suspension means which can be adjusted not only to raise and lower the lamp bank to provide optimum spacing between the lamp bank and an underlying painted surface but also to tilt the lamp bank about a horizontal axis to radiate heat perpendicularly to an inclined surface on a vehicle.

The suspension means used for this purpose comprises four cables 108, 110, 112, and 114 extending vertically upward from the four corners of the lamp bank to wind respectively around two pairs of windlasses 113, 115 supported on the frame 46.

The two windlasses 113 which receive the cables 108, 110 supporting one longitudinal side of the lamp bank 88 are nonrotatably supported on a horizontal shaft 116, Fig. 5, journaled in the frame 46. Similarlly, the two windlasses 114 which receive the cables 112 and 114 supporting the opposite side of the lamp bank are nonrotatably suported on another shaft 118 journaled in the frame 46 in spaced parallel relation to the shaft 116. The two shafts 116 and 118 are connected to rotate together by a pair of sprocket chains 120 trained around sprocket wheels 122, 124 fixed to the respective shafts.

The lamp bank 88 is raised and lowered by electrical adjusting means connected to controllably rotate the windlass shaft 118 and hence the shaft 116 in either direction. For this purpose a reversible electric motor 126, Figs. 2 and 3, is mounted on the previously mentioned frame plate 62 and drivingly connected to a speed reducer 128, which, in turn, is connected by a sprocket chain 130 to a sprocket wheel 132, Fig. 5, on the shaft 118. The gearing of the speed reducer 128 is capable of holding the shaft 118 in any adjusted position against rotation by the weight of the lamp bank 88. The motor 126 is operated through suitable electrical controls (not shown) of a character which can be readily supplied by those skilled in the art.

The lower ends of the cables 108, 110, 112, and 114 are connected in supporting relation to the lamp bank frame 89 by secondary windlass means that can be operated manually to effect tilting of the lamp bank about a horizontal axis as previously mentioned. Thus, the two cables 108 and 110, which support one longitudinal side of the lamp bank 88 are wound around a longitudinal shaft 134 journaled in the support frame 89. Opposite ends of the shaft 134 project beyond the frame 189 and connect with two hand wheels 136, 138, which can be manually rotated to either raise or lower the longitudinal side of the lamp bank 88 supported by the cables 108 and 110. To hold the shaft 134 in an adjusted position against rotation by the weight of the lamp bank, a manually operable pawl 140, Figs. 3 and 5, is pivoted to the frame member 94 to engage a ratchet wheel 142 fixed to the shaft 134 adjacent the hand wheel 136.

The lower ends of the cables 112 and 114, which support the other longitudinal side of the lamp bank 88, are wound around another shaft 144 similar to the shaft 134 but journaled in the opposite side of the frame 89. Opposite ends of the shaft 144 protrude through the frame 89 to connect with operating handles 146. This shaft is held against rotation by the weight of the lamp bank 88 by a pawl 146, Figs. 3 and 4, which engages a ratchet wheel 148 fixed to the shaft.

As will be explained presently in greater detail, the secondary windlass shafts 134 and 144 provide for convenient manual tilting of the lamp bank 88 to radiate heat perpendicularly to inclined surfaces such as those formed on opposite ends of a vehicle.

The two vertical lamp banks 84 and 86 suspended from opposite ends of the horizontal frame 46 are of similar construction. Hence a detailed description of one will suffice for both.

As shown in Fig. 1, the vertical bank 84 comprises a vertically elongated rectangular frame 150 which supports a tier of four vertically spaced lamp holders 152 generally similar in construction to the previously mentioned lamp holders 98 used in the horizontal lamp bank 88. The lamp holders 152 are placed horizontally in the frame 150. The vertical spaces between adjacent holders are covered by reflector plates 154 fixed to the frame.

The frame 150 is suspended from the adjacent end of the horizontal frame 46 by a bifurcated support head 156 comprising two spreading arms 158, 160 attached to the upper end of the frame 150 and extending upwardly in bracing relation to the frame 46. The upper end of each arm 158, 160 is widened and connected to a pair of supporting rollers 162 which rest on the adjacent side channel of the frame 46. Hence, movement of the lamp bank toward and away from a transverse vertical plane through the center of the frame 46 is basically a matter of applying horizontal force to the lamp bank to translate the roller support head 156 along the supporting frame 46.

To lock the supporting head 156 in various adjusted positions on the frame 46, a spring pressed pawl or plunger 164 is mounted in the widened upper end of the arm 158, as shown in Fig. 5, to engage any one of a horizontal series of apertures 166 formed in the supporting frame channel 48. The plunger 164 is disengaged manually to permit translation of the lamp bank 84 to a different horizontal position of adjustment. The support head 156 is prevented from running off the end of the frame 46 by a stop 167 attached to the extreme end of the frame.

The several lamp holders 152 in the bank 84 are supplied with electricity through a flexible cable 168 and controlled in pairs by switches 170 in one side of the frame 150.

As this description of the lamp bank 84 and its suspending structure is equally applicable to the lamp bank 86 and its supporting structure, structural components of the latter are designated by the same reference numerals used in the description of the former.

Many advantages realized from the improved paint baking apparatus thus provided are evident from a brief review of the general construction of the apparatus and its mode of operation. In the first place, installation of the paint baking apparatus in an automotive vehicle paint spray booth 10 is an extremely simple matter. The support rails 14, 16, which suspend the heat generating apparatus for translation along a vehicle are readily attachable to the ceiling support structure 18, as previously described. Thus mounted, the rails receive the wheeled carriage 20, which can be conveniently manufactured and shipped together with the frame 46 and the power translating and lamp bank raising and lowering structure as a single subassembly. Attachment of support cables 108, 110, 112 and 114 to suspend the lamp bank 88 below the frame 46 is very simple. The two vertical lamp banks 84, 86 are suspended from opposite ends of the frame 46 simply by moving the lamp bank support heads 156 into embracing relation to the projecting ends of the frame and attaching the stops 167. To complete the installation, the installer has merely to connect up the simple electrical circuits used in energizing and controlling the apparatus in the manner described.

Thus installed in an automotive vehicle paint spray booth 10, the apparatus minimizes the cost of a vehicle painting installation by making use of the same floor space within the booth for the spray painting and paint baking operations. In this connection it is noteworthy that the paint baking apparatus is well adapted by virtue of its relatively small space requirements, particularly as it is suspended from overhead track means, to be permanently kept within the spray booth thus avoiding the necessity for providing other space for storage purposes.

Even more significant advantages are realized from the capacity which the improved paint baking apparatus has for accommodation to automotive vehicles of different size to apply optimum paint baking heat uniformly over the entire exterior surface of each vehicle. Thus, it will be appreciated that a painting installation incorporating the improved baking apparatus provided by the invention not only has an extremely wide range of utility because of its adaptability for use with vehicles of different size but also the capability of applying optimum paint baking heat to substantially every portion of the exterior surface of a vehicle of any size that is painted in the installation.

Thus as shown in Fig. 2, the lamp bank 88 can be raised up close to the frame 46 and the vertical lamp banks 84, 86 extended out near opposite ends of the frame to accommodate a truck 13 of rather large size. On the other hand, the lamp bank 88 can be lowered and the vertical lamp banks 84, 86 moved inwardly toward each other, as indicated in phantom in Fig. 2, to provide proper spacing between the infrared lamps of the several banks and a much smaller vehicle 180 also indicated in phantom.

It is noteworthy in this connection that the ease with which the three lamp banks can be adjusted independently of each other eliminates any necessity for precise positioning of the vehicle within the spray booth. Thus any transverse off-center relationship between the vehicle and the support rails 14, 16 is of course of no consequence, since the lamp banks are individually adjusted to provide proper spacing of each lamp bank from the surface to be baked.

As previously intimated, the lamp banks are traversed longitudinally along a vehicle by the traversing motor 60 at a speed which provides proper drying of paint on the opposing vehicle surface. The application of heat at an optimum paint baking intensity to the entire surface of the vehicle is provided for by adjusting the lamp banks as necessary to maintain a proper spacing between the lamp banks and the opposing vehicle surface, as the carriage 20 traverses the vehicle. Thus, the horizontal lamp bank 88 is raised and lowered by operation of the adjusting motor 126 as necessary to maintain a proper vertical spacing between this lamp bank and the underlying vehicle surface. Hence optimum paint baking heat is supplied to the top of the body, cab and hood surfaces for a truck, for example, even though the height of these surfaces may vary considerably along the vehicle.

Moreover, the central lamp bank 88 can be tilted in the manner described as necessary to radiate heat perpendicularly toward inclined or even vertical surfaces of the vehicle to provide the same optimum paint baking heat intensity on such surfaces as on other surfaces of the vehicle. This feature is particularly useful in baking paint on the generally vertical rear surfaces on truck bodies. In this instance the motor 126 may be employed to translate the lamp bank 88 vertically to apply heat to the entire vertical surface.

While I have shown a preferred embodiment of my invention, it will be apparent that numerous variations and modifications thereof may be made without departing from the underlying principles and scope of the invention. I therefore desire, by the following claims, to include all such variations and modifications by which substantially the results of my invention may be obtained through the use of substantially the same or equivalent means.

I claim.

1. Apparatus for use in painting automotive vehicles of different size, comprising, in combination, a paint booth defining a longitudinal vehicle parking space therein, generally straight horizontal track means supported in said booth in an overhead position extending longitudinally over said vehicle parking space, a movable support carriage mounted on said track means for translation therealong, frame means supported on said carriage for translation by the latter, said frame means including two end portions spaced from each other transversely in relation to said track means to extend beyond opposite sides of said vehicle parking space, two traversing heads movably supported on said respective frame end portions for movement toward and away from each other, two generally vertical heater banks suspended by the upper ends thereof from said respective traversing heads and opposing each other across said vehicle parking space, each of said vertical heater banks including infrared heater means thereon oriented to emit heat toward the other vertical heater bank, a horizontally elongated heater bank including infrared heater means oriented to radiate heat perpendicularly therefrom, suspension means supported from said carriage and suspending said horizontally elongated heater bank to extend horizontally between said vertical heater banks, and said suspension means including adjustable means for raising and lowering said horizontally elongated heater bank in relation to said carriage.

2. Apparatus ofr curing the painted exterior surface of different size automotive vehicles and the like, comprising, in combination, horizontally elongated generally straight track means, means supporting said track means in an overhead vehicle overlying position, a support carriage, wheeled means mounting said support carriage on said track means for translation therealong, said wheeled means including a driving wheel drivingly engaging said track means, an electric translating motor supported on said carriage, speed reducing transmission means supported on said carriage and connecting said motor to said driving wheel to translate said carriage along said track means, a narrow horizontally elongated support frame mounted on said carriage in underlying perpendicular relation to said track means for translation by said carriage as the latter is moved through operation of said motor, a horizontally elongated lamp bank including a plurality of heat radiating lamps oriented to radiate heat downwardly, suspension means on said frame suspending said horizontally elongated lamp bank in underlying substantially parallel relation to the frame, said suspension means including adjustable means for raising and lowering the lamp bank relative to the frame, a pair of narrow vertical lamp banks located adjacent the respective ends of said horizontally elongated lamp bank, each of said vertical lamp banks including a plurality of heat radiating lamps oriented to radiate heat toward the other vertical lamp bank, and two movable supports movably mounted respectively on opposite ends of said support frame for translation toward and away from each other and respectively suspending said vertical lamp banks by the upper ends thereof to carry the latter toward and away from each other to adjust the spacing therebetween.

3. Apparatus for baking the painted exterior surface of different sized automotive vehicles and the like, comprising, in combination, generally straight elongated track means, means for supporting said track means in an overhead vehicle overlying position, a support carriage movably mounted on said track means for translation therealong, a translating motor, transmission means connecting said motor to translate said carriage along said track means, a horizontally elongated frame supported by said carriage in underlying generally perpendicular relation to said track means for translation therealong by the carriage, a horizontally elongated heater bank including heat radiating lamp means oriented to radiate heat downwardly, support elements depending from said frame and connected to opposite ends of said heater bank to support the heater bank below the frame in generally parallel relation thereto, a heater bank adjusting motor, transmission means connecting said adjusting motor to said support elements to move the latter vertically for raising and lowering said heater bank, two narrow vertical heater banks located adjacent the respective ends of said horizontally elongated heater bank, each vertical heater bank having heat radiating means therein oriented to emit radiant heat toward the other vertical heater bank, and two translatable supports supporting said respective vehicle heater banks by the upper ends thereof on opposite ends of said frame for translation thereon horizontally toward and away from the center of the frame.

4. Heat radiating apparatus for baking painted exterior surfaces on automotive vehicles of different size, comprising, in combination, generally straight horizontally elongated track means, means for supporting said track means in an overhead vehicle overlying position, a translatable carriage supported on said track means for translation therealong, horizontally elongated support frame means supported by said carriage in underlying generally perpendicular relation to said track means for translation by the carriage, a horizontally elongated lamp bank including heat radiating lamp means oriented to radiate heat downwardly, suspension means on said frame suspending said lamp bank in underlying generally parallel relation to the frame, said suspension means including means for raising and lowering said lamp bank and including adjustable means for tilting the lamp bank about a horizontal axis generally perpendicular to said track means, a pair of vertical lamp banks each having heat radiating lamp means oriented to radiate heat toward the other vertical lamp bank, and support heads suspending said respective lamp banks by the upper ends thereof and movably supported on opposite ends of said frame for translation toward and away from the center of the frame to carry the respective vertical lamp banks toward and away from each other.

5. Heat radiating apparatus for baking the painted exterior surfaces of automotive vehicles of different size, comprising, in combination, generally straight horizontally elongated track means, means for supporting said track means in an overhead vehicle overlying position, a support carriage, wheel means supporting said carriage on said track means for translation therealong, a translating motor, transmission means connecting said motor to translate said carriage along said track means, a horizontally elongated frame supported by said carriage in underlying generally perpendicular relation to said track means, a horizontally elongated lamp bank including heat radiating lamp means oriented to radiate heat downwardly, two pairs of flexible suspension members, means connecting said respective pairs of suspension members to support opposite longitudinal sides of said lamp bank, windlass means supported by said carriage, a lamp bank adjusting motor connected to operate said windlass means, said windlass means coacting with both of said pairs of flexible suspension members to raise and lower said bank upon operation of said adjusting motor, said means used to connect one of said pairs of suspension members to support one longitudinal side of said lamp bank including tilting windlass means connected to controllably wind up and pay out said last mentioned pair of suspension members to effect tilting movement of said lamp bank about a horizontal axis, means for releasably retaining said tilting windlass means in various adjusted positions, two vertical lamp banks, two wheeled support heads movably mounted on opposite ends of said frame for translation toward and away from the center thereof, and means connecting said support heads to support said respective vertical lamp banks for movement horizontally toward and away from each other.

6. Radiant heat apparatus for baking the painted exterior surfaces of automotive vehicles of different size, comprising, in combination, horizontally elongated track means, means for supporting said track means in an overhead vehicle overlying position, a translatable support carriage supported on said track means for translation therealong, a reversible carriage translating motor, transmission means connecting said motor to translate said carriage reversibly along said track means, horizontally elongated frame means supported by said carriage in underlying generally perpendicular relation to said track means, means for reversing said translating motor and including reversing switch means having a first component supported by said carriage and a second component fixed in relation to said track means in a position related to said first reversing switch component for reversing translation of said carriage at a predetermined position along said track means, means for deenergizing said translating motor and including a deenergizing switch having a first component supported by said carriage and a second component fixed in relation to said track means in a position related to said first deenergizing switch component to deenergize said motor as an incident to movement of the carriage to a second predetermined position along the track means, horizontally elongated frame means supported by said carriage in underlying generally perpendicular relation to said track means for translation therealong by the carriage as the latter is translated in opposite directions by said motor, a horizontally elongated lamp bank having heat radiating lamp means thereon oriented to radiate heat downwardly, windlass means supported by said carriage, flexible suspension elements trained around said windlass means and depending from said frame in longitudinally spaced relation therealong to support opposite ends of said lamp bank, an adjusting motor supported by said carriage, transmission means connecting said adjusting motor to said windlass means to raise and lower said lamp bank, a pair of vertical lamp banks each having heat radiating lamp means oriented to radiate heat toward the other vertical lamp bank, and movable support heads mounted on opposite ends of said frame for translation toward and away from the center thereof and supporting said respective vertical lamp banks for horizontal adjustment toward and away from each other.

7. Apparatus for use in painting automotive vehicles, comprising, in combination, generally straight elongated track means, means for supporting said track means in an overhead vehicle overlying position, a movable support carriage mounted on said track means for translation therealong, frame means supported on said carriage for translation by the latter and including two end portions spaced from each other transversely in relation to said track means, two traversing heads movably supported on said respective frame end portions for movement toward and away from each other, two generally vertical heater banks suspended by the upper ends thereof from said respective traversing heads, each vertical heater bank including infrared heater means oriented to emit radiant heat toward the other vertical heater bank, a horizontally elongated heater bank including infrared heater means oriented to radiate heat perpendicularly therefrom, and suspension means supported from said carriage and suspending said horizontally elongated heater in a horizontal position extending longitudinally between said vertical heater banks.

8. Apparatus for use in painting automotive vehicles of different size, comprising, in combination, means defining an elongated vehicle parking space, generally straight elongated track means, means supporting said track means in an overhead position extending longitudinally over said vehicle parking space, a movable support carriage mounted on said track means for translation therealong, two frame elements supported on said carriage, said frame elements being spaced from each other transversely in relation to said track means to extend beyond opposite sides of said vehicle parking space, two vertical heater banks disposed generally on opposite sides of said parking space and suspended by the upper ends thereof from said respective frame elements, each of said vertical banks including radiant heater means thereon oriented to emit heat toward the other heater bank, suspension means supported on said carriage, a horizontally elongated heater bank supported in a horizontal position by said suspension means to extend longitudinally between said vertical heater banks, said horizontally elongated heater bank including radiant heater means oriented to radiate heat perpendicularly therefrom, and said suspension means including adjustable means for raising and lowering said horizontally elongated bank in relation to said carriage.

References Cited in the file of this patent

UNITED STATES PATENTS

| | | |
|---|---|---|
| 1,571,282 | Leculier | Feb. 2, 1926 |
| 2,340,354 | Wells | Feb. 1, 1944 |
| 2,377,946 | Leary | June 12, 1945 |
| 2,387,516 | Kaminski | Oct. 23, 1945 |
| 2,472,293 | Groven | June 7, 1949 |
| 2,498,339 | Miskella | Feb. 21, 1950 |
| 2,761,948 | Todd | Sept. 4, 1956 |

FOREIGN PATENTS

| | | |
|---|---|---|
| 914,329 | France | Oct. 4, 1946 |